United States Patent [19]

Okada

[11] 4,108,625
[45] Aug. 22, 1978

[54] METHOD OF, AND APPARATUS FOR PRODUCING FERTILIZER BY UTILIZING EARTHWORMS

[75] Inventor: Tokio Okada, Yokkaichi, Japan

[73] Assignee: Okada Seimen Yugen Kaisha, Yokkaichi, Japan

[21] Appl. No.: 744,772

[22] Filed: Nov. 24, 1976

[30] Foreign Application Priority Data

Nov. 26, 1975 [JP] Japan ................................ 50-141878

[51] Int. Cl.$^2$ ............................................. C05F 11/08
[52] U.S. Cl. ............................................. 71/9; 71/21; 71/64 A
[58] Field of Search ..................... 71/15, 21, 64 A, 1, 71/11, 23, 9; 119/6

[56] References Cited

U.S. PATENT DOCUMENTS

| 3,372,018 | 3/1968 | Stocker et al. | 71/64 A X |
| 3,716,371 | 2/1973 | Calvert et al. | 71/21 X |
| 4,023,954 | 5/1977 | de Maudave | 71/15 |

OTHER PUBLICATIONS

Agriculture, Warming Away, Newsweek, Jun. 21, 1976, pp. 67-68.

*Primary Examiner*—Ferris H. Lander
*Attorney, Agent, or Firm*—Irvin A. Lavine

[57] ABSTRACT

A great many earthworms are bred in a layer of fermented vegetable matter, such as waste cotton and straw, which is maintained in a duly moistened condition. The earthworms eat the vegetable matter and discharge feces. The feces are gathered and refined into a natural organic fertilizer or manure through a number of steps including removal or killing of earthworm eggs.

9 Claims, 4 Drawing Figures

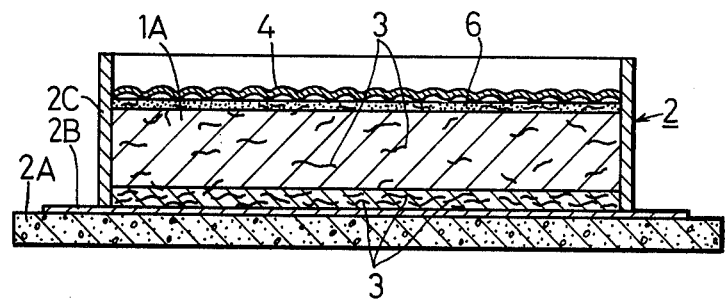
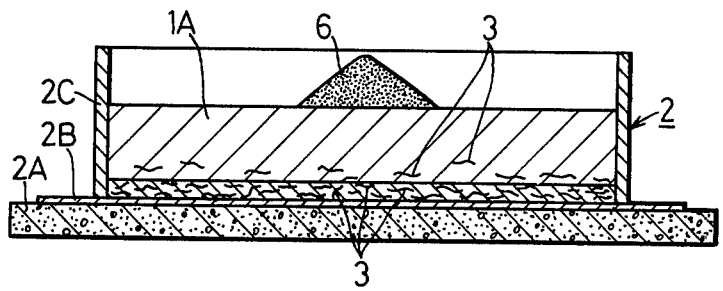

METHOD OF, AND APPARATUS FOR PRODUCING FERTILIZER BY UTILIZING EARTHWORMS

This invention relates to the production of a natural fertilizer or manure by utilizing earthworms.

It is an object of this invention to provide a method of producing a natural organic fertilizer or manure by utilizing the digestive and excretory process of earthworms.

It is another object of this invention to provide an apparatus adapted for effectively carrying out the method of this invention.

This invention uses vegetable matter, such as waste cotton and straw, for raw material. The vegetable matter is moistened with a sufficient quantity of water and kept in a sufficiently wetted condition to undergo fermentation. A layer of the matter thus fermented is used to breed a great number of earthworms. The earthworms feed on the fermented matter and discharge feces on the top of the layer. The feces are collected and eggs of earthworms in the feces are removed or killed, whereby a fertilizer in the granular form is obtained.

The fertilizer or manure produced according to this invention is different from an artificial or chemical fertilizer and is a natural organic fertilizer which contains no product of a chemical process. It can advantageously be used for a long period of time continuously without exerting any such adverse chemical effect on the soil as a chemical fertilizer does. Further, it is a very effective or nutritive fertilizer which also contains other waste matter excreted by earthworms in addition to the feces.

The fertilizer according to this invention does not contain any living earthworm eggs, because they are all removed or killed. Therefore, there is no fear of worm reproduction from the fertilizer in a farm, or wherever else it may be used or stored.

Any excess of earthworms grown during the course of fertilizer production according to this invention may advantageously be used as bait or food for fish, birds or the like, or when dried, as raw material for the preparation of a Chinese medicine, such as an antifebrile.

Other features and advantages of this invention will become apparent from the following detailed description and the accompanying drawings, in which:

FIGS. 3 and 4 are views similar to FIG. 2, but illustrating different stages of progress of fertilizer production.

Figure 1:
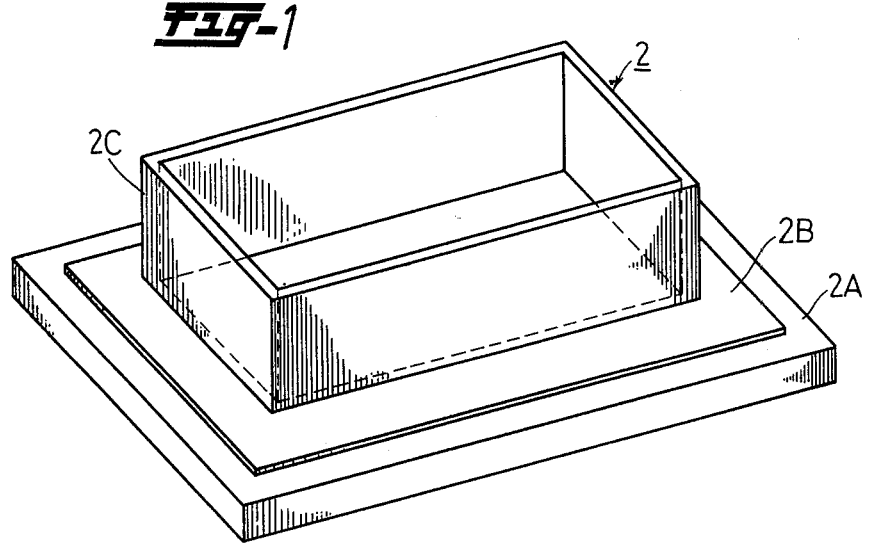
FIG. 1 is a partly omitted perspective view of the apparatus embodying this invention.

The invention will now be described in further detail by way of example, in which waste cotton, including cotton seeds, is used for raw material which is fed to and digested by earthworms to eventually produce a fertilizer or manure. The approximate analysis of such waste cotton is considered to comprise 1.86% of nitrogen, 0.68% of phosphoric acis and 1.98% of potassium (potash).

A predetermined quantity of waste cotton, which depends on the dimensions of the apparatus used for fertilizer production according to this invention as will hereinafter be described, is moistened with a sufficient quantity of water. This water is supplied to the waste cotton by any appropriate usual method and the waste cotton is left in the open air. Additional water is supplied to the waste cotton from time to time to keep it in a wet condition for about four months to allow it to undergo fermentation.

Referring to the drawings, there is shown an apparatus embodying this invention as generally indicated at 2. The apparatus 2 comprises a base plate 2A preferably made of concrete and a box-shaped body 2C placed on the base plate 2A. The body 2C is immovably supported on the base plate 2A by an appropriate supporting means not shown. The body 2C may be of any suitable dimensions, but according to the example now being described, it is 100 cm wide, 200 cm long and 40 cm deep. The body 2C may be made of wood, concrete or plastics, but if it is made of plastics, it must be opaque. A sheet of plastics 2B is preferably interposed between the base plate 2A and the body 2C to provide a seal therebetween to prevent undesirable leakage of water from the interior of the body 2C. The sheet 2B may be of polyethylene, polypropylene or vinyl chloride. The sheet 2B should, however, not form a seal which completely closes the clearance between the base plate 2A and the body 2C, but a minimized size of clearance should be maintained between the bottom edges of the body 2C and the sheet 2B to allow any excess of water to leak out from the body 2C.

The bottom 2C is adapted to contain a layer or layers of vegetable matter or soil or both in which earthworms are to be bred for fertilizer production according to this invention. A first layer 10 is composed of fermented waste cotton or soil or a mixture of both and provided in the bottom of the body 2C. The layer 10 is preferably about 5 cm in thickness or height and provides a house for earthworms.

Any kind of earthworms that are locally available may be used for the purpose of this invention, but in the example being described, brandling worms, *Eisenia foetida,* are used merely for illustration. A great number of brandlings 3 are placed in the layer 10. The number of the brandlings 3 may depend on a variety of factors, including the volume of the body 2C, the quantity available of fermented vegetable matter, the availability of the worms and the productivity desired, but is not considered to be very critical. It may satisfactorily range approximately between 20,000 and 50,000.

Figure 2:
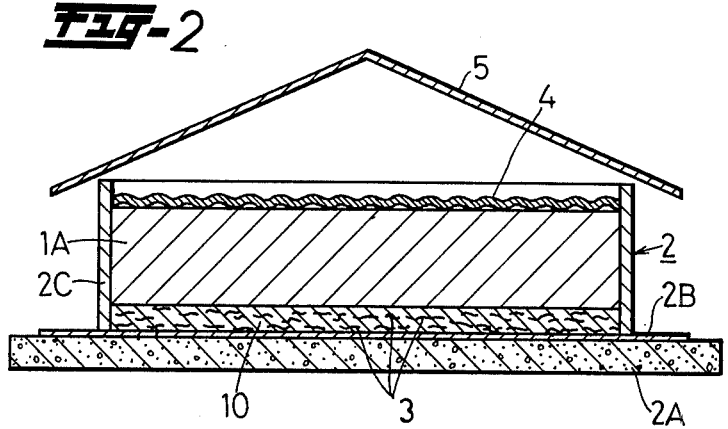
FIG. 2 is a vertical sectional view of the apparatus of FIG. 1 shown in its completely equipped form at the beginning of fertilizer production according to this invention.

A second layer 1A is composed of fermented waste cotton placed on the first layer 10 and provides a layer of food which is eaten by the brandlings 3 living in the first layer 10. The second layer 1A is preferably 30 cm in thickness or height, so that an open space of about 5 cm in height is provided at the upper end of the body 2C. The top of the second layer 1A is covered with a sheet of material which permits water to flow therethrough, but which can prevent any substantial evaporation of water therethrough. This sheet is preferably a straw mat 4 loosely fitted in the open space above the second layer 1A to leave a certain clearance between itself and the second layer 1A as shown in FIG. 2 for the reason which will become apparent as the description proceeds. The apparatus 2 preferably further includes a roof 5 removably placed over the body 2C to prevent exposure of the contents of the body 2C to the direct rays of the sun. The roof 5 may be made of any material that is suitable for the purpose mentioned in the immediately preceding sentence. The roof 5 is suitably supported on the upper edges of the body 2C by means not shown, but provided to define a sufficiently large clearance for ventilation between the body 2C and the roof 5. The roof 5 can, however, be placed directly on the top of the body or housing 2C if adequate ventilation is anyhow ensured between the interior and the exterior of the apparatus.

It is important to see occasionally if the layer 1A of fermented waste cotton is in a sufficiently wet condition. Additional water is supplied to the layer 1A from time to time if necessary to maintain the fermented waste cotton in an adequately moistened condition. The optimum frequency of such additional water supply would depend on the season and the local climatic conditions, but it would generally be suitable to supply water once in a week or so in spring or fall. The quantity of the water to be supplied each time would depend on the dryness of the layer 1A, but it would generally be sufficient to supply about 20 liters of water in case of the example under discussion. When water is supplied, it is not necessary to remove the straw mat 4, but water is supplied through the mat 4. The quantity of each such water supply is not very critical, because any excessive quantity of water, which is not retained in the layers 1A and 10, is conveniently allowed to leak out through the clearance between the housing 2C and the bottom sheet 2B.

The apparatus is left under such moisture control for a month or so. During this period, the brandlings 3 move back and forth between the first and second layers 10 and 1A and eat fermented waste cotton. They digest the fermented waste cotton and discharge feces 6 on the top surface of the second or upper layer 1A as shown in FIG. 3. This is one of the behaviors peculiar to these earthworms. As they grow, the brandlings 3 produce eggs and increase through incubation.

During this one-month period, the feces 6 discharged by the brandlings 3 form an about 1 cm thick layer of feces 6 on the second layer 1A as shown in FIG. 3. At this stage, the straw mat 4 is removed and the feces 6 are gathered up into a heap by any appropriate means as shown in FIG. 4. The roof 5 is also removed and the interior of the aparatus 2 is exposed to the sun for a day. Upon this radiation of the rays of the sun, all the brandlings 3 that may have stayed in the layer of the feces 6 and been collected together into the heap escape from the rays of the sun and burrow into the layer 1A or 10.

The feces 6 thus gathered are then transferred from the apparatus 2 into an appropriate container not shown by any suitable means, and dried by exposure to the sun for a day. The feces 6 are then screened by a sieve or screen having relatively large meshes, for example, of 1 cm and the coarse particles of feces trapped on the screen are thrown away. The remaining finer grains of feces 6 are received in a container, spread into a thin layer and dried by exposure to the sun for a couple of days. The feces 6 usually contain a great many eggs of brandlings which must be removed. These eggs generally have a diameter ranging approximately between 2.5 mm and 4.0 mm. Therefore, the feces 6 are screened by a finer-mesh sieve and in view of the size of the eggs mentioned above, a 9-mesh sieve having about 2 mm wide meshes would be useful for the purpose. The granular product thus obtained by separation of the feces from the eggs is used as a fertilizer. The eggs retained on the screen are returned into the apparatus for another cycle of fertilizer production. The coarse particles of feces separated during the first step of sieving may also be brought back into the apparatus 2, instead of being thrown away.

A number of cycles of operation may be repeated in accordance with the foregoing sequence for producing a plurality of lots of fertilizer. The fermented waste cotton in the layer 1A (and also in the lower layer 10 if it contains any such fermented vegetable matter) is, however, reduced as it is digested by the brandlings 3, and requires occasional replenishment. For this reason, it is generally preferable to interrupt the repetition of production sequence at the end of every third cycle of operation and put new fermented vegetable matter into the layer 1A. It is alternatively possible to replenish the layer 1A at the end of every second cycle of operation. As reproduction or increase of the brandlings 3 in the apparatus 2 takes place during the course of a particular cycle of operation, it is most advisable or even necessary to either reduce the number of the brandlings 3 or use a larger apparatus, for another cycle of operation.

While too small a number of earthworms makes the productiveness of the apparatus poorer, such poorer productivity can also result from too great an increase in the earthworms. An overpopulation of brandlings 3 within the predetermined limits of the apparatus 2 may bring about a larger quantity of fertilizer production during an initial cycle of operation, but as the fermented vegetable matter in the layer 1A is digested very quickly, it becomes necessary to replenish the layer 1A in order to place the apparatus 2 in condition for a second cycle of operation. This means that fresh fermented vegetable matter must be supplied into the apparatus at the end of each cycle of production. Such frequent repetition of replenishment spoils the living environment of the brandlings 3 and the environment thus spoiled may worsen the reproductivity of the brandlings and sometimes lead to their death. It is, therefore, most desirable to see that an optimum number of earthworms be used relative to the size of the apparatus, or more particularly the volume of the layer 1A of fermented vegetable matter.

The bottom layer 10 in the apparatus 2 is composed of either fermented vegetable matter, soil or a mixture of both. It is to be noted in this connection that in case fermented vegetable matter is used to form the layer 10, it is important to use sufficiently fermented vegetable matter which has undergone complete fermentation, while the vegetable matter forming the upper layer 1A need not be so sufficiently fermented. Thus, as the production or the growth of the brandlings 3 proceeds, the vegetable matter in the layer 1A undergoes further fermentation and generates heat of fermentation. As this heat becomes intense, the behavior of the brandlings 3 is to escape into a less hot region and they can move back into the bottom layer 10 in which no heat of fermentation is generated. From a different standpoint, however, the generation of heat by fermentation in the layer 1A is advantageous during the colder season of the year, because the earthworms can protect themselves against cold by moving into the layer 1A.

The fertilizer or manure produced according to this invention may, by way of example, contain 2.04% of nitrogen, 0.75% of phosphoric acid and 1.25% of potash, as well as 36.51% of water. In addition to the feces of earthworms, the fertilizer contains the remains of the earthworms which have died and been decomposed during the process of production, and secretions of earthworms. These additional contents are considered to increase the value or utility of the fertilizer produced according to this invention. Experiments by the inventor indicate that flowers, vegetables and other plants grown in the soil fed with the fertilizer of this invention can show a markedly better growth than those grown without using this fertilizer.

While the invention has herein been described with reference to a preferred embodiment thereof, it is to be understood that modifications or variations may be readily made by those skilled in the art without departing from the spirit and scope of this invention defined by the appended claims. For example, the layer of food for earthworms may further include fermented straw, sawdust, waste wool and/or sludge. While the apparatus has been described and shown as comprising a housing which is open at both of its upper and lower ends, a housing closed at bottom may equally be used if its bottom is provided with a suitable number of apertures for drainage purpose which are sized to prevent escape of earthworms therethrough. Furthermore, earthworm eggs can be killed by exposure of the feces to heat in an appropriate manner, instead of being removed by sieving as hereinbefore described.

What I claim is:

1. A method of producing a natural fertilizer, comprising:
   forming a layer of fermented vegetable matter which is maintained in a moistened condition;
   breeding earthworms in said layer, in which said earthworms eat said vegetable matter and discharge feces on said layer;
   gathering said feces; and
   refining said feces, whereby said fertilizer is obtained.

2. The method as defined in claim 1, further including:
   forming another layer of material beneath said first mentioned layer.

3. The method as defined in claim 2, wherein said material of said other layer comprises a material selected from the group consisting of fermented vegetable matter, soil and a mixture of both.

4. The method as defined in claim 3, wherein said fermented vegetable matter of said other layer comprises fermented waste cotton.

5. The method as defined in claim 1, wherein said fermented vegetable matter comprises fermented waste cotton.

6. The method as defined in claim 1, wherein said refining comprises:
   exposing said feces to the sun to expel any of said earthworms in said feces into said layer;
   separating larger particles from said feces; and
   removing live eggs of said earthworms from said feces.

7. The method as defined in claim 6, wherein said live eggs are removed by sieving said feces.

8. The method as defined in claim 6, wherein said live eggs are removed by heating said feces to thereby kill said eggs.

9. The method as defined in claim 1, wherein said earthworms comprise brandling worms called *Eisenia foetida*.

* * * * *